US012693535B2

(12) United States Patent
Ma et al.

(10) Patent No.: US 12,693,535 B2
(45) Date of Patent: Jul. 28, 2026

(54) AUGMENTED REALITY DISPLAY DEVICE

(71) Applicant: NINGBO SUNNY OPOTECH CO., LTD., Yuyao City (CN)

(72) Inventors: Keqi Ma, Yuyao City (CN); Yiqi Wang, Yuyao City (CN); Qinfeng Xu, Yuyao City (CN)

(73) Assignee: NINGBO SUNNY OPOTECH CO., LTD., Yuyao City (CN)

( * ) Notice: Subject to any disclaimer, the term of this patent is extended or adjusted under 35 U.S.C. 154(b) by 293 days.

(21) Appl. No.: 18/272,718

(22) PCT Filed: Dec. 17, 2021

(86) PCT No.: PCT/CN2021/139258
§ 371 (c)(1),
(2) Date: Jul. 17, 2023

(87) PCT Pub. No.: WO2022/151920
PCT Pub. Date: Jul. 21, 2022

(65) Prior Publication Data
US 2024/0085702 A1 Mar. 14, 2024

(30) Foreign Application Priority Data
Jan. 18, 2021 (CN) .......................... 202110061744.4

(51) Int. Cl.
*G02B 27/01* (2006.01)
*G02B 6/34* (2006.01)
*G06T 19/00* (2011.01)
(52) U.S. Cl.
CPC ........... *G02B 27/0172* (2013.01); *G02B 6/34* (2013.01); *G06T 19/006* (2013.01); *G02B 2027/0112* (2013.01); *G02B 2027/0178* (2013.01)

(58) Field of Classification Search
CPC .................. G02B 27/0172; G02B 6/34; G02B 2027/0112; G02B 2027/0178; G06T 19/006
See application file for complete search history.

(56) References Cited

U.S. PATENT DOCUMENTS 6,805,490 B2 * 10/2004 Levola ................. G02B 5/1866
359/24
10,690,916 B2 * 6/2020 Popovich ............. G02B 6/0035
(Continued)

FOREIGN PATENT DOCUMENTS

CN 101263412 A 9/2008
CN 105487170 A 4/2016
(Continued)

OTHER PUBLICATIONS

Extended European Search Report for European Application No. 21919107.9, dated Jul. 11, 2024.
(Continued)

*Primary Examiner* — Thomas A Hollweg
*Assistant Examiner* — Marc E Manheim
(74) *Attorney, Agent, or Firm* — Birch, Stewart, Kolasch & Birch, LLP

(57) ABSTRACT

An augmented reality display device (100), comprising: a light engine (102) for emitting image light; and at least one layer of optical waveguide lens (101) comprising an in-coupling grating region (1012), an optical waveguide substrate (1011) and a turning and out-coupling grating region (1013), wherein the in-coupling grating region (1012) is disposed on a first optical surface of the optical waveguide substrate (1011); the optical waveguide substrate (1011) is configured to transmit the image light through total reflection; the turning and out-coupling grating region (1013) is disposed on the first optical surface of the optical waveguide substrate (1011) for receiving totally reflected light and (Continued)

coupling it out; and a sum of the in-coupling grating vector and the turning and out-coupling grating vectors is not zero, wherein the in-coupling angles of the light engine (102) and the respective layers of optical waveguide lenses (101) are identical. As a result, the light engine (102) and the optical waveguide lenses (101), even in the case of non-perpendicular in-coupling, can ensure that the central field of view of the light engine (102) coincides with the central field of view of human eyes, greatly improving the degree of freedom of the structural design of the light engine (102) and the optical waveguide lenses (101), so that the structure of the augmented reality display device (100) is diversified, and the display device is manufactured as having a smaller size.

8 Claims, 7 Drawing Sheets

(56) References Cited

U.S. PATENT DOCUMENTS

| | | | | |
|---|---|---|---|---|
| 10,795,156 | B2 | 10/2020 | Marshall | |
| 11,698,492 | B2 * | 7/2023 | Bablumyan | G02B 27/1006 |
| | | | | 359/15 |
| 2011/0096401 | A1 * | 4/2011 | Levola | G02B 27/0172 |
| | | | | 359/573 |
| 2013/0101253 | A1 | 4/2013 | Popovich et al. | |
| 2014/0140653 | A1 | 5/2014 | Brown et al. | |
| 2015/0325202 | A1 | 11/2015 | Lake et al. | |
| 2017/0115519 | A1 * | 4/2017 | Shi | G02B 27/0172 |

| | | | | |
|---|---|---|---|---|
| 2018/0292592 | A1 | 10/2018 | Danziger | |
| 2019/0025645 | A1 | 1/2019 | Aleta | |
| 2019/0056593 | A1 | 2/2019 | Bablumyan | |
| 2020/0333615 | A1 | 10/2020 | Blomstedt et al. | |
| 2021/0026140 | A1 * | 1/2021 | Kasegawa | G02B 6/0023 |
| 2021/0191180 | A1 * | 6/2021 | Malhotra | C08L 67/00 |

FOREIGN PATENT DOCUMENTS

| | | |
|---|---|---|
| CN | 105954876 A | 9/2016 |
| CN | 106526848 A | 3/2017 |
| CN | 106842397 A | 6/2017 |
| CN | 109239842 A | 1/2019 |
| CN | 110471185 A | 11/2019 |
| CN | 209624815 U | 11/2019 |
| CN | 110764260 A | 2/2020 |
| CN | 111830715 A | 10/2020 |
| CN | 111965750 A | 11/2020 |
| CN | 111999894 A | 11/2020 |
| CN | 112180606 A | 1/2021 |
| CN | 114815233 A | 7/2022 |
| EP | 3 339 936 A1 | 6/2018 |
| EP | 3 361 147 A1 | 8/2018 |
| WO | WO 2020/233543 A1 | 11/2020 |

OTHER PUBLICATIONS

International Search Report (PCT/ISA/210) issued in PCT/CN2021/139258, dated Mar. 15, 2022.

Chinese Office Action for Chinese Application No. 202180089504.3, dated Jun. 4, 2026.

* cited by examiner

AUGMENTED REALITY DISPLAY DEVICE

CROSS REFERENCE TO RELATED APPLICATIONS

This application is the National Phase of PCT International Application PCT/CN2021/139258, filed on Dec. 17, 2021, which claims priority under 35 U.S.C. 119(a) to Patent Application No. 202110061744.4, filed in China on Jan. 18, 2021, all of which are hereby expressly incorporated by reference into the present application.

TECHNICAL FIELD

The present application relates to the technical field of augmented reality, and in particular, to an augmented reality display device.

TECHNICAL BACKGROUND

At present, Augmented Reality (AR) technology is the integration of virtual information and the real world. Augmented reality technology represented by augmented reality glasses is currently emerging in various industries, especially in the security and industrial fields. Augmented reality technology embodies unparalleled advantages and greatly improves the way of information interaction. At present, relatively mature augmented reality technology is mainly divided into a prism scheme, a birdbath scheme, a free-form surface scheme, an off-axis holographic lens scheme and a waveguide (lightguide) scheme. The first three schemes have a relatively large volume, which limits their applications in smart wearables, i.e., augmented reality glasses. The holographic lens scheme uses unique optical characteristics of holographic sheets to have the advantages of large field of view (FOV) and small volume, but is limited by the relatively small range of eye movement. Moreover, the holographic waveguide scheme has advantages in color uniformity (no rainbow effect) and the realization of single-chip full-color waveguides, but is currently limited in mass production and large field of view. Waveguides are currently the best scheme for augmented reality glasses. The waveguide scheme is further divided into a geometric waveguide scheme, a relief grating waveguide scheme and a volume holographic waveguide scheme. The geometric waveguide scheme generally includes a sawtooth structure waveguide and a polarizing film array mirror waveguide (simply referred to as a polarization array waveguide). Among them, the mainstream polarization array waveguide uses a partially transmissive and partially reflective film mirror of the array to achieve the purpose of displaying virtual information. The polarization array waveguide scheme has the advantages of lightness, thinness, large eye movement range and uniform color. The relief grating waveguide scheme can be mass-produced by a nano-imprinting process, and has the advantages of large field of view and large eye movement range, but it also brings challenges of field of view uniformity and color uniformity. Meanwhile, the related micro-nano machining process is also a huge challenge.

The inventors have found that, generally, if the central field of view of the light engine is to coincide with the central field of view of the human eye, the light engine needs to be in-coupled perpendicularly to the optical waveguide lens, resulting in a lower degree of freedom in structural design. The field of view for out-coupled image light is relatively small due to being limited by the optical waveguide lens and the light engine itself.

The above information disclosed in the Background Art is only for enhancement of understanding of the background of the application and therefore it may contain information that does not form the prior art that is already known to a person of ordinary skill in the art.

SUMMARY

Based on this, the present application provides an augmented reality display device, and solves the dispersion problem of the optical waveguide lens by selecting a visible laser light source. Through the technical solution of the present application, the light engine and the optical waveguide lens, even in the case of non-perpendicular in-coupling, can ensure that the central field of view of the light engine coincides with the central field of view of human eyes, greatly improving the degree of freedom of the structural design of the light engine and the optical waveguide lenses.

The features and advantages of the technical solution of the present application will become apparent through the following detailed description, or partly be learned through the practice of the present application.

According to one aspect of the present application, an augmented reality display device is proposed. The augmented reality display device comprises: a light engine for emitting image light; at least one layer of optical waveguide lens for coupling in, turning and coupling out the image light emitted by the light engine, the at least one layer of optical waveguide lens comprising an in-coupling grating region, an optical waveguide substrate, and a turning and out-coupling grating region, wherein the in-coupling grating region is disposed on a first optical surface of the optical waveguide substrate, and receives the transmitted image light emitted by the light engine; the optical waveguide substrate is configured to transmit the image light through total reflection; the turning and out-coupling grating region is disposed on the first optical surface of the optical waveguide substrate, receives the totally reflected light transmitted by the optical waveguide substrate and couples it out; a sum of the in-coupling grating vector and the turning and out-coupling grating vectors is not zero, wherein the in-coupling angles of the light engine and the at least one layer of optical waveguide lens are identical.

According to some embodiments, each layer of optical waveguide lens corresponds to a respective one color of image light.

According to some embodiments, the optical grating configuration of the turning and out-coupling grating region needs to satisfy the following formula:

$$k_0 \sin\theta + k_0 \sin\gamma + \frac{2\pi}{\Lambda_1} - \frac{2\pi}{\Lambda_2} = 0$$

wherein $$k_0 = \frac{2\pi}{\lambda},$$

$\theta$ is an included angle between an in-coupling direction of the light engine and a surface normal line of the at least one layer of optical waveguide lens, $\lambda$ is a wavelength of the transmitted image light, $\gamma$ is an included angle between a surface of the at least one layer of optical waveguide lens and a vertical direction, $\Lambda_1$ is an in-coupling grating period, and $\Lambda_2$ is a turning and out-coupling grating period.

According to some embodiments, the included angle $\theta$ between the light engine and the surface normal line of the at least one layer of optical waveguide lens ranges from 0° to 15°.

According to some embodiments, the included angle $\gamma$ between the surface of the at least one layer of optical waveguide lens and the vertical direction and the included angle $\theta$ of the surface normal line of the at least one layer of optical waveguide lens satisfy the following formula:

$$\theta + \gamma \leq 20°.$$

According to some embodiments, the turning and out-coupling grating region comprises a one-dimensional surface relief grating or a two-dimensional surface relief grating.

According to some embodiments, the image light transmitted by a light source of the light engine comprises visible laser light, and the dispersion of the optical waveguide lens is limited by a narrow linewidth characteristic of the light source.

According to some embodiments, a linewidth of the visible laser light, an in-coupling grating period, and a turning and out-coupling grating period satisfy the following formula:

$$\delta\lambda = \frac{\Lambda_1\Lambda_2 \sin\varepsilon \cos\theta}{\Lambda_1 - \Lambda_2},$$

wherein $\varepsilon$ is an angular resolution of a human eye, $\theta$ is an included angle between an in-coupling direction of the light engine and a surface normal line of the at least one layer of optical waveguide lens, $\Lambda_1$ is an in-coupling grating period, $\Lambda_2$ is a turning and out-coupling grating period, and $\delta\lambda$ is the linewidth of the visible laser light.

According to some embodiments, the turning and out-coupling grating region is configured as a two-dimensional surface relief grating, wherein the periods of the turning and out-coupling grating along two directions are each $\Lambda_3$, an included angle is $\alpha$, and a linewidth of the visible laser light satisfies the following formula:

$$\delta\lambda = \frac{\lambda \sin\varepsilon}{\tan\theta}$$

wherein $\varepsilon$ is an angular resolution of a human eye, $\theta$ is an included angle between an in-coupling direction of the light engine and a surface normal line of the at least one layer of optical waveguide lens, and $\lambda$ is a wavelength of the transmitted image light.

According to some embodiments, the light engine emits RGB three-color light; the at least one layer of optical waveguide lens comprises three layers of optical waveguide lenses, each layer of optical waveguide lens having an in-coupling period and a turning and out-coupling period corresponding to each color of light; and a sum of the in-coupling grating vector and the turning and out-coupling grating vectors is not zero, wherein the in-coupling angles of the light engine and each of the three layers of optical waveguide lenses are all identical.

According to some embodiments, the light engine emits RGB three-color light, comprising:

blue light having a linewidth range between 0 to 2.0 nm, optionally between 0 to 0.5 nm;

green light having a linewidth range between 0 to 2.3 nm, optionally between 0 to 0.5 nm;

red light having a linewidth range between 0 to 2.7 nm, optionally between 0 to 0.5 nm.

According to some embodiments, the optical waveguide substrate has a thickness of 0.3 mm to 2.5 mm and a refractive index of 1.4 to 2.2.

According to some embodiments, the optical waveguide substrate is transparent, has a fixed thickness, has two opposite optical planes, and is made of a material comprising glass or quartz.

According to the technical solution of the present application, a planar optical waveguide lens, whose grating vector sum is not zero, is proposed, so that the light engine and the optical waveguide lens, even in the case of non-perpendicular in-coupling, can ensure that the central field of view of the light engine coincides with the central field of view of the human eye, through the combination of the visible light laser and the waveguide sheet whose grating vector sum is not zero, the degree of freedom in the structural design of light engine and optical waveguide lens is greatly improved.

It should be understood that the above general description and the following detailed description are only exemplary, and cannot limit the present application.

BRIEF DESCRIPTION OF THE DRAWINGS

In order to more clearly illustrate the technical solutions in embodiments of the present application, the drawings needed to be used in the description of the embodiments will be briefly described below. Obviously, the drawings in the following description are only some embodiment examples of the present application, and other drawings can be obtained by those of ordinary skill in the art from these without exceeding the scope of protection of the present application.

DETAILED DESCRIPTION OF THE EMBODIMENTS

Figure 1:
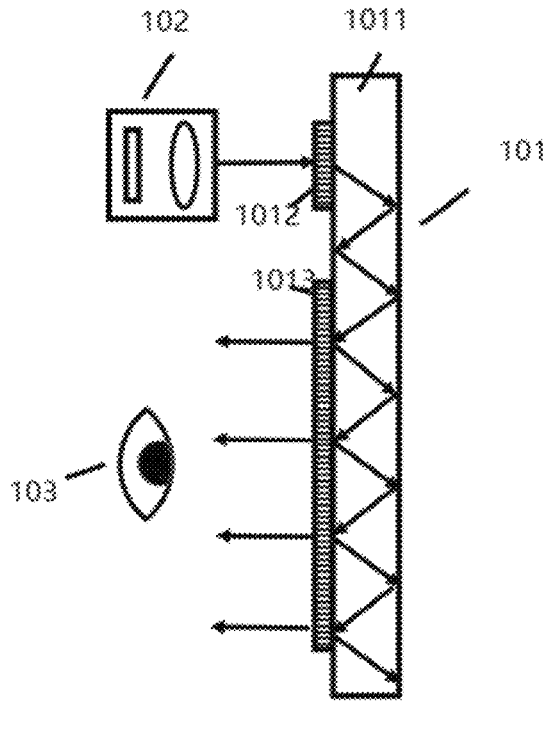
FIG. 1 shows a side view of an augmented reality display device according to an exemplary embodiment.

Exemplary embodiments will now be described more fully with reference to the accompanying drawings. However, the exemplary embodiments can be embodied in many forms and should not be construed as being limited to the embodiments set forth herein. Rather, these embodiments are provided so that the present application will be thorough and complete, and the concepts of the exemplary embodiments are fully conveyed to those skilled in the art. The same reference numerals in the drawings denote the same or similar parts, and a repeated description thereof will be omitted.

The described features, structures, or characteristics may be combined in any suitable manner in one or more embodiments. In the following description, many specific details are set forth to provide a thorough understanding of the embodiments of the present disclosure. However, those skilled in the art will appreciate that the technical solution of the present disclosure may be practiced without one or more of the specific details, or other methods, components, materials, devices, etc. may be employed. In these instances, well-known structures, methods, devices, implementing steps, materials, or operations will not be shown or described in detail.

Furthermore, the terms "include"/"comprise" and "have", as well as any variations thereof, are intended to cover a non-exclusive inclusion. For example, a process, method, system, product or device including a series of steps or units is not limited to the listed steps or units, but optionally also includes unlisted steps or units, or optionally further includes other steps or units inherent in these processes, methods, products or devices.

The terms "first", "second", etc. in the description and claims of the present application and the above drawings are used to distinguish different objects, rather than to describe a specific order. Furthermore, the terms "include"/"comprise" and "have", as well as any variations thereof, are intended to cover a non-exclusive inclusion.

FIG. 1 shows a side view of an augmented reality display device according to an exemplary embodiment.

A currently known augmented reality display device 100 is shown in FIG. 1. It includes an optical waveguide lens 101 and a light engine 102. The optical waveguide lens 101 includes an optical waveguide substrate 1011, an in-coupling grating region 1012, and a turning and out-coupling grating region 1013. The in-coupling grating region is configured as a one-dimensional surface relief grating. The turning and out-coupling grating region may be configured as a one-dimensional surface relief grating, or a two-dimensional surface relief grating.

According to an embodiment, after image light from the light engine 102 is coupled into the grating region 1012, diffracted light is totally reflected by the optical waveguide substrate 1011 and transmitted to the turning and out-coupling grating region 1013, and finally diffracted to a human eye 103, wherein a sum of the in-coupling grating vector and the turning and out-coupling grating vectors is not zero, and the in-coupling angles of the light engine and the layers of optical waveguide lenses are identical.

The optical waveguide substrate 1011 is transparent to visible light and has two opposite optical planes for total reflection and transmission of image light. Optionally, the optical waveguide substrate 1011 has a thickness of 0.3 mm to 2.5 mm, and a refractive index of 1.4 to 2.2 (the refractive index of currently commercially available optical materials is generally within this range), and the optical waveguide substrate is made of a material including glass or quartz.

According to known theoretical characteristics, the waveguide substrate 1011 in the present application should be light and thin and have a large refractive index. Using the principle of total reflection, light injected by the light engine that satisfies the respective conditions may be totally reflected, and thus the task of transporting light from the light engine to the front of the human eye can be realized.

The known augmented reality display device 100 realizes that the huge light engine around the eyes is shifted aside, such as on the side surface and at the forehead, without blocking the line of sight, and through a transmission medium such as the optical waveguide lens 101, the light is brought to the front of the eye.

Another big advantage is that it may increase the range of orbital movement (with the glasses on, how far in x and y can the eye move around the center point of the system to still see the image clearly), so increasing the orbital movement range makes it easier to adapt to all groups of people when making products.

Of course, there are also some shortcomings, such as relatively low optical efficiency, and for diffractive waveguides, there will be some rainbow phenomena caused by dispersion, uneven colors, and alternating light and dark light. Usually, if the central field of view of the light engine is to coincide with the central field of view of the human eye, the light engine needs to be in-coupled perpendicularly to the optical waveguide lens, resulting in a lower degree of freedom of structural design.

Figure 2:
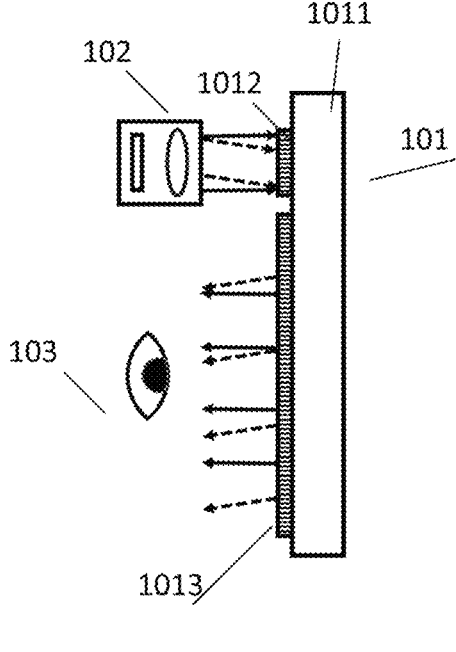
FIG. 2 shows a side view of a light engine coupling with an optical waveguide lens in a perpendicular manner according to an exemplary embodiment.

FIG. 2 shows a side view of a light engine coupling with an optical waveguide lens in a perpendicular manner according to an exemplary embodiment.

Figure 4:
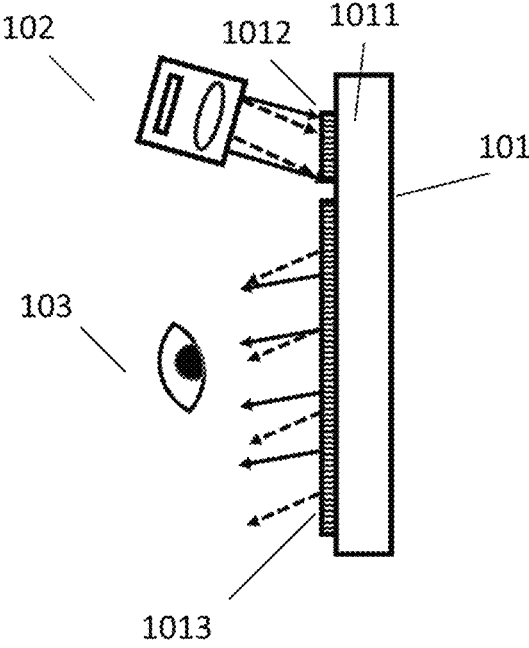
FIG. 4 shows a side view of a light engine coupling with an optical waveguide lens in a non-perpendicular manner according to an exemplary embodiment.

As shown in FIG. 2, usually, the light engine is coupled perpendicularly to the optical waveguide lens, so that the central field of view of the light engine may correspond to the central field of view observed by the human eye. However, the perpendicular coupling layout limits the degree of freedom of the layout of the light engine and the optical waveguide lens, which is disadvantageous to the structural design of AR glasses. If the light engine and the optical waveguide lens are coupled in a non-perpendicular manner, in order to make the central field of view observed by the human eye coincide with the central field of view of the light engine, the human eye and the optical waveguide lens will not be parallel (see FIG. 4), which will affect the user's observation experience.

Figure 3:
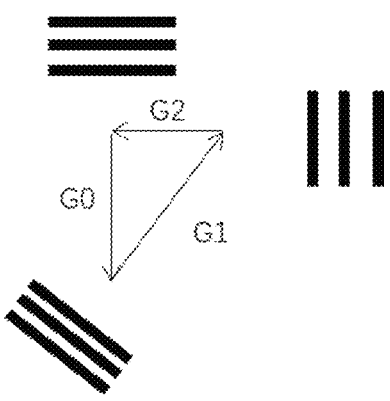
FIG. 3 shows a schematic diagram in which a sum of the in-coupling grating vector and the turning and out-coupling grating vectors is zero according to an exemplary embodiment.

FIG. 3 shows a schematic diagram of a sum of the in-coupling grating vector and the turning and out-coupling grating vectors according to an exemplary embodiment.

As shown in FIG. 3, generally, in the design of optical waveguide lenses, the sum of the in-coupling grating vector and the turning and out-coupling grating vectors is 0, that is, the in-coupling grating vector is $\overrightarrow{G_0}$, the turning grating vector is $\overrightarrow{G_1}$, the out-coupling grating vector is $\overrightarrow{G_2}$, and $\overrightarrow{G_0}+\overrightarrow{G_1}+\overrightarrow{G_2}=0$.

According to an embodiment, when the turning and out-coupling grating region is configured as a one-dimensional surface relief grating, the corresponding grating vector refers to a vector sum of the turning grating vector and the out-coupling grating vector; and when the turning and out-coupling grating region is configured as a two-dimensional surface relief grating, the corresponding grating vector refers to a grating vector of the two-dimensional surface relief grating.

Commonly used relief gratings are mainly one-dimensional gratings, which include oblique gratings, trapezoidal gratings, blazed gratings, rectangular grating structures, etc. For two-dimensional gratings, such as a cylindrical grating structure with hexagonal distribution commonly used in waveguides, the characteristic dimensions of the grating structures above are all on the nanometer scale. Therefore, the routes of current relief grating waveguides mainly include a one-dimensional grating-based relief grating waveguide scheme, with a schematic diagram as shown in FIG. 1, which is divided into in-coupling, turning and out-coupling regions. The three regions each adopt a one-dimensional grating, and the expansion in one direction is carried out in the turning region and the out-coupling region separately.

A two-dimensional grating-based relief grating waveguide scheme is divided into in-coupling and out-coupling regions. The classic structure of the in-coupling region is a one-dimensional grating, and the structure of the out-coupling area is a two-dimensional grating (not shown in the figure). Multiple stages of the two-dimensional grating structure are used to simultaneously ensure out-coupling of the beam and expansion in multiple directions. A K-domain diagram of a two-dimensional grating waveguide is calculated by simulation (see FIGS. 11 to 13). An inner circle represents that light satisfies a total reflection condition in the waveguide, and an outer circle represents a maximum K value that can be achieved by the material of the waveguide. The in-coupling grating translates the K value of the beam to an annular region, that is, the beam satisfies the condition of total reflection propagation in the waveguide. The out-coupling grating translates the K value of part of the beam from the annular region to the inner ring region, that is, the beam is coupled out to the human eye.

At this time, in the case of transmission, the light coupled out to the human eye is in the same direction as the light coupled into the optical waveguide lens by the light engine; and in the case of reflection, the direction of the light coupled out to the human eye and the light coupled into the optical waveguide lens by the light engine are mirror-symmetrical with respect to the normal line of the surface of the optical waveguide lens.

Figure 5:
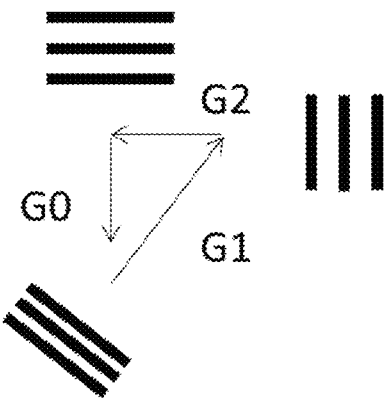
FIG. 5 shows a schematic diagram in which a sum of the in-coupling grating vector and the turning and out-coupling grating vectors is not zero according to an exemplary embodiment.

FIG. 5 shows a schematic diagram in which a sum of the in-coupling grating vector and the turning and out-coupling grating vectors is not zero according to an exemplary embodiment.

Figure 6:
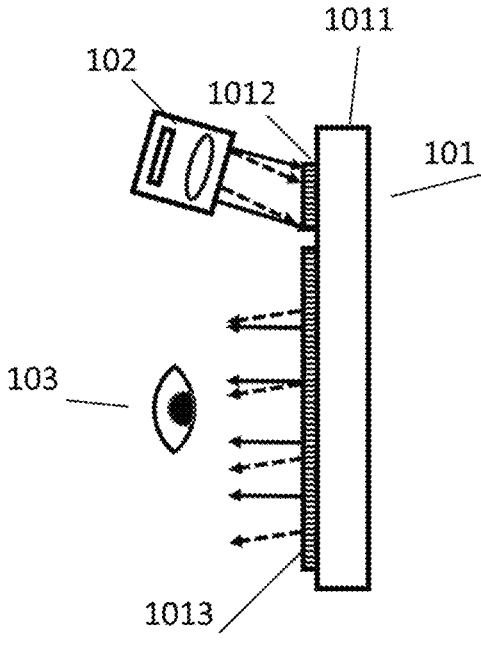
FIG. 6 shows a side view of a light engine coupling with an optical waveguide lens in a non-perpendicular manner according to another exemplary embodiment.

As shown in FIG. 5, the sum of the grating vectors of the in-coupling grating and the turning and out-coupling gratings is not zero, that is, the in-coupling grating vector is $\overrightarrow{G_0}$, the turning grating vector is $\overrightarrow{G_1}$, the out-coupling grating vector is $\overrightarrow{G_2}$, and $\overrightarrow{G_0}+\overrightarrow{G_1}+\overrightarrow{G_2}\neq0$. According to the existing theory, since the period of the grating is inversely proportional to the size of the grating vector, in the technical solution of the present application, by calculating the in-coupling grating period and the turning and out-coupling grating period of different periods under the total reflection condition, it is possible to realize that when the light engine is coupled into the optical waveguide lens in a non-perpendicular manner, the human eye still observes the central field of view of the light engine at an angle parallel to the optical waveguide lens (see FIG. 6).

At this time, since the vector sum of the gratings of the optical waveguide lens is not zero, there will be a problem of dispersion, and using a light source with a narrow linewidth can make the dispersion phenomenon invisible to the human eye. The linewidth that does not affect the imaging quality of the optical waveguide lens can be obtained in a way as described below.

Figure 7:
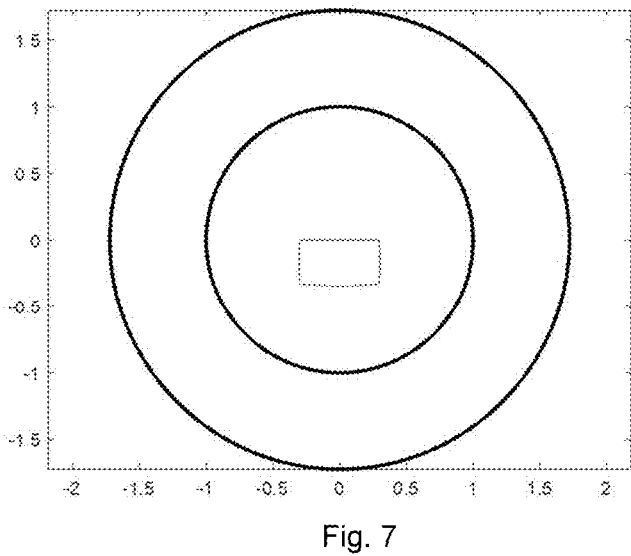
FIG. 7 shows a distribution diagram of a light source of a light engine in a K space according to an exemplary embodiment.

FIG. 7 shows a distribution diagram of a light source of a light engine in a K space according to an exemplary embodiment.

Figure 8:
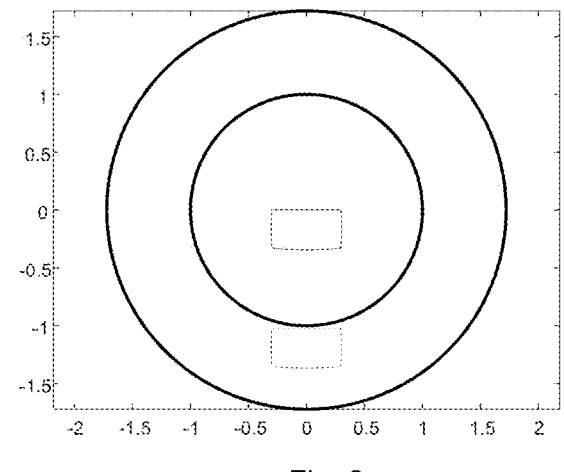
FIG. 8 shows a distribution diagram in a K space after the light source of the light engine is coupled in according to an exemplary embodiment.

FIG. 8 shows a distribution diagram in a K space after the light source of the light engine is coupled in according to an exemplary embodiment.

Figure 9:
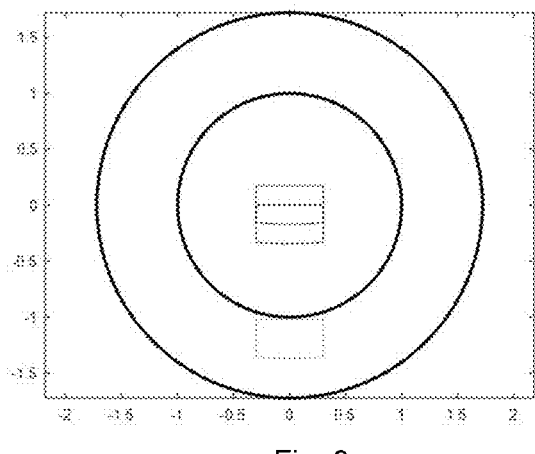
FIG. 9 shows a distribution diagram in a K space after the light source of the light engine is coupled out according to an exemplary embodiment.

FIG. 9 shows a distribution diagram in a K space after the light source of the light engine is coupled out according to an exemplary embodiment.

Refer to FIGS. 7 to 9, which involve a distribution of a light source of a light engine in the K space (see FIG. 7). According to an embodiment, in the case that the turning and out-coupling grating is configured as a one-dimensional surface relief grating, it is set so that an included angle between the light engine and the surface normal line of the optical waveguide lens during in-coupling is $\theta=10°$, the central wavelength of the light source is $\lambda_c=460$ nm, a half-maximum wavelength (or FWHM wavelength) is $\lambda_1$, the field of view of the light engine is 40°, and the refractive index of the optical waveguide lens is n=1.7216. The period of the in-coupling grating is set to $\Lambda_1$, and its size is such that it is just distributed in the ring. After the light output by the light engine is coupled into the one-dimensional surface relief grating, the distribution in the K space is shown in FIG. 8.

After the light passes through the one-dimensional surface relief turning and out-coupling grating, the period of the turning and out-coupling grating is set to adjust the out-coupling central field of view to output perpendicularly from the optical waveguide lens. After the light passes through the one-dimensional surface relief turning and out-coupling grating, the distribution in the K space is shown in FIG. 9. Since the grating vector sum of the optical waveguide lens is not zero, the dispersion of the optical waveguide lens is unavoidable (compared with the distribution in FIG. 7).

According to an embodiment, by using a visible light laser as a light source, its narrow linewidth characteristic can be used to limit the dispersion of the optical waveguide lens, so that the dispersion phenomenon cannot be observed by human eyes. The linewidth of the required visible light laser may be calculated by the following formula:

$$\delta\lambda = \frac{\Lambda_1\Lambda_2\sin\varepsilon\cos\theta}{\Lambda_1 - \Lambda_2},$$

wherein $\varepsilon$ is an angular resolution of the human eye. Specifically, it may be taken as 1', and for AR glasses, 2' is also acceptable. It is known that the included angle between the light engine and the surface normal line of the optical waveguide lens during in-coupling is $\theta=10°$. For the above-mentioned embodiment, under the condition that the resolution of the human eye is 1', it can be solved that the linewidth of the visible light laser is 0.76 nm, wherein $\Lambda_1=460$ nm, and $\Lambda_2=384.7$ nm.

When the light source emits RGB three-color light, the method for calculating the linewidth of the visible light laser is the same. It will not be repeated here, and does not limit the present application.

Specifically, light emitted by an object passes through the pupil of the human eye, and is imaged on the retina through the refraction system of the human eye. Since the focal length of the human eye is only about 20 mm, the image on the retina is like a Fraunhofer hole diffraction pattern. The pupil is basically a circular hole, and its diameter is adjusted by the iris in the range of 2 mm to 8 mm. Under normal light conditions, the pupil diameter is about 3 mm, the most sensitive green light wavelength of the human eye is 550 nm, and the minimum resolution angle of the human eye is 1'.

Specifically, the field of view of a light engine is 40°. It is understood that, in an optical instrument, a lens of the optical instrument is assumed as a vertex, and an included angle formed by two edges of the maximum range where an object image of a measured target can pass through the lens, is called the field of view (FOV). The range of view of the optical instrument is determined by the size of the field of view. The larger the field of view is, the larger the range of view and the smaller the optical magnification. In layman's terms, if a target object exceeds this angle, it will not be collected in the lens.

Figure 10:
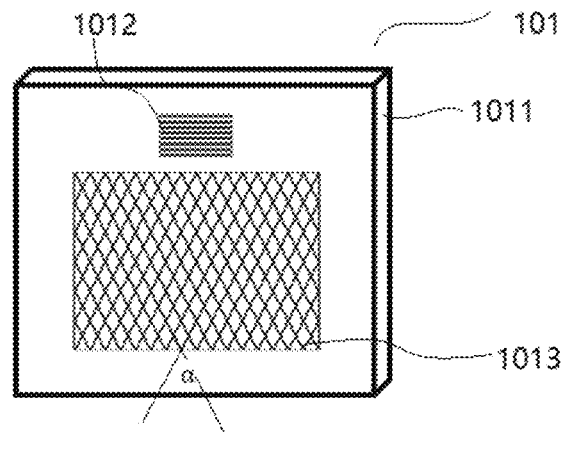
FIG. 10 shows a schematic perspective view of a turning and out-coupling grating being a two-dimensional grating according to an exemplary embodiment.

FIG. 10 shows a schematic perspective view of a turning and out-coupling grating being a two-dimensional grating according to an exemplary embodiment.

As shown in FIG. 10, according to an embodiment, for the optical waveguide substrate 1011 of the optical waveguide lens 101, the in-coupling grating region 1012 is configured as a one-dimensional surface relief grating. The turning and out-coupling grating region 1013 is configured as a two-dimensional surface relief grating. The two-dimensional surface relief grating is composed of two one-dimensional surface relief gratings. Both periods of the two-dimensional gratings in two directions are $\Lambda_3$ and the included angle is $\alpha$.

Figure 11:
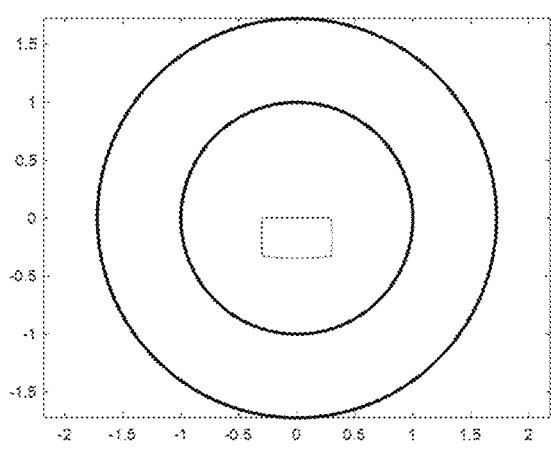
FIG. 11 shows a distribution diagram of a light source of a light engine in a K-space according to another exemplary embodiment.

FIG. 11 shows a distribution diagram of a light source of a light engine in a K-space according to another exemplary embodiment.

Figure 12:
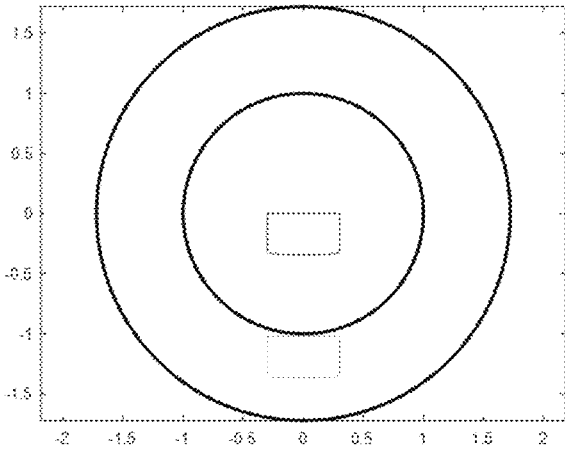
FIG. 12 shows a distribution diagram in a K space after the light source of the light engine is coupled in according to an exemplary embodiment.

FIG. 12 shows a distribution diagram in a K space after the light source of the light engine is coupled in according to another exemplary embodiment.

Figure 13:
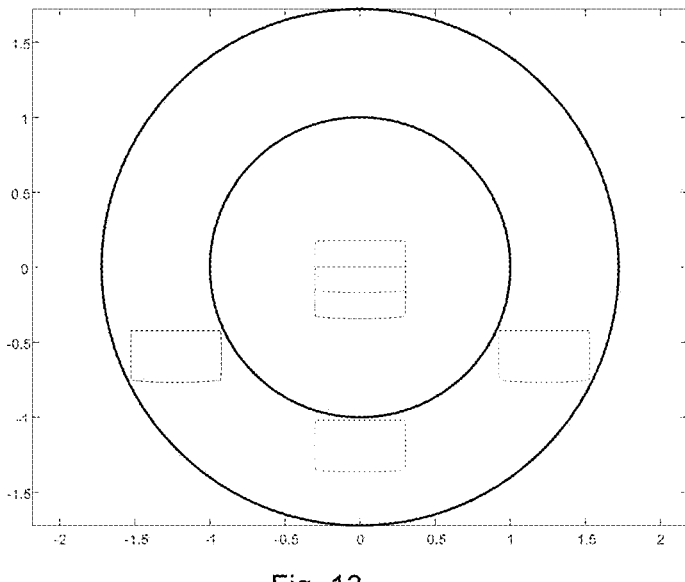
FIG. 13 shows a distribution diagram in a K space after the light source of the light engine is coupled out of a two-dimensional grating according to an exemplary embodiment.

FIG. 13 shows a distribution diagram in a K space after the light source of the light engine is coupled out of a two-dimensional grating according to an exemplary embodiment.

Refer to FIGS. 11 to 13, which involve a distribution of a light source of an optical unit in the K space at the central wavelength. According to an embodiment, in the case that the turning and out-coupling grating is configured as a two-dimensional surface relief grating, it is set so that an included angle between the light engine and the surface normal line of the optical waveguide lens during in-coupling is $\Lambda=10°$, the central wavelength of the light source is $\lambda_c=460$ nm, a half-maximum wavelength (or FWHM wavelength) is $\lambda_1$, the field of view of the light engine is 40°, and the refractive index of the optical waveguide lens is n=1.7216.

The period of the in-coupling grating is set to $\Lambda_1$, and its size is such that it is just distributed in the ring. After the light output by the light engine is coupled into the grating, the distribution in the K space is shown in FIG. 12. The light source is coupled out through the two-dimensional grating, and both periods of the two-dimensional grating along the two directions are $\Lambda_3$, and the included angle is $\alpha$, so that the out-coupling central field of view is perpendicular to the output of the optical waveguide lens, as shown in FIG. 13. The linewidth of the required visible light laser may be calculated by the following formula:

$$\delta\lambda = \frac{\lambda\sin\varepsilon}{\tan\theta},$$

wherein $\varepsilon$ is the angular resolution of the human eye. Specifically, 1' can be taken, and 2' is also acceptable for AR glasses. It is known that the included angle between the light engine and the surface normal line of the optical waveguide lens during in-coupling is $\theta=10°$. It can be solved that the linewidth of the visible light laser is also 0.76 nm. It can be seen that the required linewidth of the visible light laser is irrelevant with whether the turning and out-coupling grating is a one-dimensional grating or a two-dimensional grating.

When the light source emits RGB three-color light, the method for calculating the linewidth of the visible light laser is the same. It will not be repeated here, and should not be used as a limitation of the present application.

According to the above optical waveguide lens, the grating vector sum is not zero, and there will be a dispersion problem. The K space distribution diagram is obtained through experiments, and the linewidth of the visible light laser is calculated according to the known setting conditions and parameters, so that the human eye cannot observe the dispersion phenomenon.

Further description will be given below according to embodiments.

According to an embodiment, three layers of RGB optical waveguide lenses are stacked in a direction perpendicular to the surface of the waveguide sheet in the order of blue, green, and red light sheets (not shown in the figure). Optionally, a cut-off filter is disposed between each layer of optical waveguide lenses so that light of a cut-off wavelength does not pass through. Specifically, a blue light cut-off filter is disposed between the blue light sheet and the green light sheet so that the blue light does not pass through; correspondingly, a green light cut-off filter is disposed between the green light sheet and the red light sheet so that the green light does not pass through. The included angles between the surfaces of the three layers of optical waveguide lenses and the vertical direction are all $\gamma$, and the included angles between the in-coupling direction of the light engine and the surface normal lines of the respective layers of optical waveguide lenses are all $\theta$. The optical waveguide lens substrate material with a refractive index of n=1.72 is selected, and the dominant wavelengths of the light engine are 460 nm, 530 nm, and 620 nm. At present, the minimum linewidth of the visible light laser of the light engine is generally 0.5 nm. Under the condition that the linewidth of the visible light laser of the light engine is 0.5 nm, the inclination angle range of the light engine may be 0 to 15°, and the inclination angle should not be too large, otherwise it will lead to distortion of images.

The following embodiments of the above conditions included according to the description of the embodiments do not limit the present application.

Figure 14:
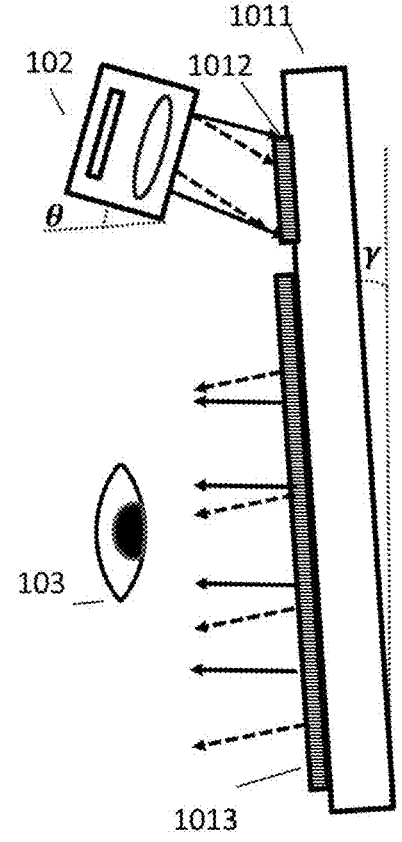
FIG. 14 shows a side view of a light engine coupling with a RGB three-layer optical waveguide lens in a non-perpendicular manner according to an exemplary embodiment.

FIG. 14 shows a side view of a light engine coupling with at least one layer of optical waveguide lens in a non-perpendicular manner according to an exemplary embodiment.

As shown in FIG. 14, in this embodiment, the included angle between the light engine and the surface normal line of the optical waveguide lens is $\theta=10°$, and the included angle between the surface of the optical waveguide lens and the vertical direction is $\gamma=5°$. At this time, $\theta+\gamma$ should not exceed 20°. This limit can be relaxed if the linewidth of the visible light laser is further reduced. For light of different wavelengths, the in-coupling period and turning and out-coupling periods of the grating are different. Generally, different optical waveguide lenses are used to transmit light of different wavelengths. When the light emitted by the light engine is composed of RGB three colors, three layers of optical waveguide lenses are used as a transmission medium, and each layer of optical waveguide lens has its own in-coupling period and turning and out-coupling periods corresponding to each color of light. In this embodiment, blue light with $\lambda=460$ nm is taken as an example, and details for red light and green light can be obtained in the same way, which will not be repeated here. In order to make the in-coupling light satisfy the total reflection transmission in the optical waveguide lens substrate, the in-coupling grating period is set to $\Lambda_1=460$ nm, the turning and out-coupling grating is set so that the light in the central field of view of the light engine is transmitted through the optical waveguide lens and then coupled out of the central field of view of the human eye, in which $$k_0 \sin\theta + k_0 \sin\gamma + \frac{2\pi}{\Lambda_1} - \frac{2\pi}{\Lambda_2} = 0$$

must be satisfied, wherein $$k_0 = \frac{2\pi}{\lambda}.$$

The vertical midline clockwise is set as a positive direction, and $\gamma$ may be a negative value, namely, the included angle $\gamma$ between the optical waveguide lens 101 and the vertical midline when it rotates counterclockwise. That is, the corresponding optical waveguide lens is tilted toward the eye side. It can be obtained that the period of the turning and out-coupling grating in this embodiment is $\Lambda_2=364.9$ nm.

Figure 15:
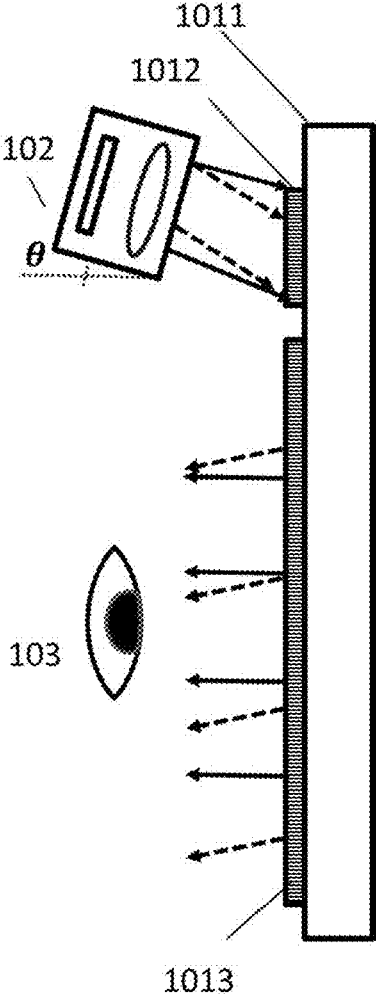
FIG. 15 shows a side view of a light engine coupling with a RGB three-layer optical waveguide lens in a non-perpendicular manner according to another exemplary embodiment.

FIG. 15 shows a side view of a light engine coupling with three layers of optical waveguide lenses in a non-perpendicular manner according to another exemplary embodiment.

As shown in FIG. 15, in this embodiment, the included angle between the light engine and surface normal line of the optical waveguide lens is $\theta=10°$, and the waveguide sheet is vertically disposed so that the included angle between the surface of the optical waveguide lens and the vertical direction is $\gamma=0°$. At this time, $\theta+\gamma$ should not exceed 20°.

This limit can be relaxed if the linewidth of the visible light laser is further reduced. For light of different wavelengths, the in-coupling period and turning and out-coupling periods of the grating are different. Generally, different optical waveguide lenses are used to transmit light of different wavelengths. When the light emitted by the light engine is composed of RGB three colors, three layers of optical waveguide lenses are used as a transmission medium, and each layer of optical waveguide lens has its own in-coupling period and turning and out-coupling periods corresponding to each color of light. In this embodiment, blue light with $\lambda=460$ nm is taken as an example, and details for red light and green light can be obtained in the same way. In order to make the in-coupling light satisfy the total reflection transmission in the optical waveguide lens substrate, the in-coupling grating period is set to $\Lambda_1=460$ nm, the turning and out-coupling grating is set so that the light in the central field of view of the light engine is transmitted through the optical waveguide lens and then coupled out of the central field of view of the human eye, in which $$k_0 \sin\theta + k_0 \sin\gamma + \frac{2\pi}{\Lambda_1} - \frac{2\pi}{\Lambda_2} = 0$$

must be satisfied, wherein $$k_0 = \frac{2\pi}{\lambda},$$

and the corresponding turning and out-coupling grating period is $\Lambda_2=391.94$ nm.

Continuing to refer to FIG. 15, in this embodiment, the included angle between the light engine and surface normal line of the optical waveguide lens is $\theta=10°$, and the waveguide sheet is vertically disposed so that the included angle between the surface of the optical waveguide lens and the vertical direction is $\gamma=0°$. At this time, $\theta+\gamma$ should not exceed 20°. This limit can be relaxed if the linewidth of the visible light laser is further reduced. For light of different wavelengths, the in-coupling period and turning and out-coupling periods of the grating are different. Generally, different optical waveguide lenses are used to transmit light of different wavelengths. When the light emitted by the light engine is composed of RGB three colors, three layers of optical waveguide lenses are used as a transmission medium, and each layer of optical waveguide lens has its own in-coupling period and turning and out-coupling periods corresponding to each color of light. In this embodiment, blue light with $\lambda=460$ nm is taken as an example, and details for red light and green light can be obtained in the same way, which will not be repeated here. In order to make the in-coupling light satisfy the total reflection transmission in the optical waveguide lens substrate, the in-coupling grating period is set to $\Lambda_1=460$ nm, the turning and out-coupling grating is set so that the light in the central field of view of the light engine is transmitted through the optical waveguide lens and then coupled out of the central field of view of the human eye. The corresponding turning and out-coupling grating is a two-dimensional grating, which is composed of two one-dimensional gratings, each of which has a period of 337 nm. The included angle between the two gratings is 52°.

Continuing to refer to FIG. 15, in this embodiment, the included angle between the light engine and surface normal line of the optical waveguide lens is $\theta=15°$, and the waveguide sheet is vertically disposed so that the included angle between the surface of the optical waveguide lens and the vertical direction is $\gamma=0°$. At this time, $\theta+\gamma$ should not exceed 20°. This limit can be relaxed if the linewidth of the visible light laser is further reduced. For light of different wavelengths, the in-coupling period and turning and out-coupling periods of the grating are different. Generally, different optical waveguide lenses are used to transmit light of different wavelengths. When the light emitted by the light engine is composed of RGB three colors, three layers of optical waveguide lenses are used as a transmission medium, and each layer of optical waveguide lens has its own in-coupling period and turning and out-coupling periods corresponding to each color of light. In this embodiment, blue light with $\lambda=460$ nm is taken as an example, and details for red light and green light can be obtained in the same way, which will not be repeated here. In order to make the in-coupling light satisfy the total reflection transmission in the optical waveguide lens substrate, the in-coupling grating period is set to $\Lambda_1=500$ nm, the turning and out-coupling grating is set so that the light in the central field of view of the light engine is transmitted through the optical waveguide lens and then coupled out of the central field of view of the human eye, in which $$k_0 \sin\theta + k_0 \sin\gamma + \frac{2\pi}{\Lambda_1} - \frac{2\pi}{\Lambda_2} = 0$$

must be satisfied, wherein $$k_0 = \frac{2\pi}{\lambda},$$

ods corresponding to each color of light. In this embodiment, taking blue light with $\lambda=460$ nm as an example, in order to make the in-coupling light satisfy the total reflection transmission in the optical waveguide lens base, the in-coupling grating period is set to $\Lambda_1=400$ nm, the turning and out-coupling grating is set so that the light in the central field of view of the light engine is transmitted through the optical waveguide lens and then coupled out of the central field of view of the human eye, and the corresponding turning and out-coupling grating period is $\Lambda_2=378$ nm. Then, it is calculated according to the linewidth of the required laser that $$\delta\lambda = \frac{\Lambda_1 \Lambda_2 \sin\varepsilon \cos\theta}{\Lambda_1 - \Lambda_2}$$

is $\delta\lambda=2$ nm. Similarly, it can be calculated that when the wavelength of green light is $\lambda=530$ nm, in order to make the in-coupled light energy satisfy the total reflection transmission in the optical waveguide lens substrate, the in-coupling grating period is set to $\Lambda_1=440$ nm, the turning and out-coupling grating period is set to $\Lambda_2=416.9$ nm, and then the corresponding laser linewidth is calculated to be $\delta\lambda=2.3$ nm.

Similarly, it can be calculated that when the red light wavelength is $\lambda=620$ nm, in order to make the coupled-in light energy satisfy the total reflection transmission in the optical waveguide lens substrate, the in-coupling grating period is set to $\Lambda_1=510$ nm, and the turning and out-coupling grating period is set to $\Lambda_2=483.3$ nm. Then, the corresponding laser linewidth is calculated to be $\delta\lambda=2.7$ nm.

Table 1 shows that according to the embodiment, the blue light $\lambda=460$ nm satisfies the laser linewidth range of 0 to 2 nm at different included angles and grating periods, wherein the optional range is less than or equal to 0.5 nm.

| Laser linewidth $\delta\lambda$/nm | In-coupling grating period $\Lambda_1$/nm | One-dimensional out-coupling grating period $\Lambda_2$/nm | Two-dimensional out-coupling grating period $\Lambda_3$/nm | Included angle $\gamma$ | Included angle $\theta$ |
|---|---|---|---|---|---|
| 0.5 | 460 | 364.9 | — | 5° | 10° |
| 0.5 | 460 | — | 391.94 | 0° | 10° |
| 0.5 | 460 | 337 | — | 0° | 10° |
| 0.5 | 500 | 390.2 | — | 0° | 15° |
| 2 | 400 | 378 | — | 0° | 3.83° | and the corresponding turning and out-coupling grating period is $\Lambda_2=390.2$ nm.

Continuing to refer to FIG. 15, this embodiment, the included angle between the light engine and surface normal line of the optical waveguide lens is $\theta=3.83°$, and the waveguide sheet is vertically disposed so that the included angle between the surface of the optical waveguide lens and the vertical direction is $\gamma=0°$. At this time, $\theta+\gamma$ should not exceed 20°. This limit can be relaxed if the linewidth of the visible light laser is further reduced. For light of different wavelengths, the in-coupling period and turning and out-coupling periods of the grating are different. Generally, different optical waveguide lenses are used to transmit light of different wavelengths. When the light emitted by the light engine is composed of RGB three colors, three layers of optical waveguide lenses are used as a transmission medium, and each layer of optical waveguide lens has its own in-coupling period and turning and out-coupling peri- The statistical data of red light and green light will not be described here in the above manner.

Through the technical solutions of the embodiments of the application, the present application provides an augmented reality display device, and solves the dispersion problem of the optical waveguide lens by using a light source with a narrow linewidth so that the human eye cannot observe the dispersion phenomenon. Moreover, a detailed and feasible description of satisfying the conditions is given in the embodiments. Through the technical solution of the present application, the light engine and the optical waveguide lens, even in the case of non-perpendicular in-coupling, can ensure that the central field of view of the light engine coincides with the central field of view of human eyes, greatly improving the degree of freedom of the structural design of the light engine and the optical waveguide lenses.

The above is a detailed introduction to the embodiments of the present application. Specific examples are used herein to illustrate the principles and implementation methods of the present application. The descriptions of the above embodiments are only used to help understand the methods and core ideas of the present application. At the same time, changes or modifications made by those skilled in the art based on the ideas of the present application, specific implementation methods and application scopes of the application all belong to the scope of protection of the present application. To sum up, the content of the description should not be understood as limiting the present application.

What is claimed is:

1. An augmented reality display device, comprising:
a light engine for emitting image light;
at least one layer of optical waveguide lens for coupling in, turning and coupling out the image light emitted by the light engine, the at least one layer of optical waveguide lens comprising an in-coupling grating region, an optical waveguide substrate, and a turning and out-coupling grating region,
wherein
the in-coupling grating region is disposed on a first optical surface of the optical waveguide substrate, and receives the transmitted image light emitted by the light engine;
the optical waveguide substrate is configured to transmit the image light through total reflection;
the turning and out-coupling grating region is disposed on the first optical surface of the optical waveguide substrate, receives the totally reflected light transmitted by the optical waveguide substrate and couples it out; and
a sum of the in-coupling grating vector and the turning and out-coupling grating vectors is not zero,
wherein an angle of image light emitted from the light engine, relative to a surface normal line of the at least one layer of optical waveguide lens, is identical to an in-coupling angle at which the image light is coupled into the at least one layer of optical waveguide lens, so that the image light emitted from the light engine is efficiently coupled into the at least one layer of optical waveguide lens;
wherein the image light transmitted by a light source of the light engine comprises visible laser light, and the dispersion of the optical waveguide lens is limited by a narrow linewidth characteristic of the light source;
wherein the turning and out-coupling grating region is configured as a two-dimensional surface relief grating, wherein periods of the turning and out-coupling grating are $\Lambda_3$ along two directions, and a linewidth $\delta\lambda$ of the visible laser light satisfies the following formula:

$$\delta\lambda = \frac{\lambda \sin\varepsilon}{\tan\theta}$$

wherein $\varepsilon$ is an angular resolution of a human eye, $\theta$ is an included angle between an in-coupling direction of image light emitted from the light engine and the surface normal line of the at least one layer of optical waveguide lens, and $\lambda$ is a wavelength of the transmitted image light.

2. The display device according to claim 1, wherein the at least one layer of optical waveguide lens corresponds to a respective one color of image light.

3. The display device according to claim 1, wherein a grating period of the turning and out-coupling grating region needs to satisfy the following formula:

$$k_0\sin\theta + k_0\sin\gamma + \frac{2\pi}{\Lambda_1} - \frac{2\pi}{\Lambda_2} = 0$$

wherein $$k_0 = \frac{2\pi}{\lambda},$$

$\theta$ is the included angle between the in-coupling direction of image light emitted from the light engine and the surface normal line of the at least one layer of optical waveguide lens, $\lambda$ is the wavelength of the transmitted image light, and $\gamma$ is an included angle between a surface of the at least one layer of optical waveguide lens and a vertical direction, wherein the vertical direction is perpendicular to a direction of sight, $\Lambda_1$ is an in-coupling grating period, and $\Lambda_2$ is a turning and out-coupling grating period.

4. The display device according to claim 3, wherein the included angle $\theta$ between the in-coupling direction of image light emitted from the light engine and the surface normal line of the at least one layer of optical waveguide lens ranges from 0° to 15°.

5. The display device according to claim 4, wherein the included angle $\gamma$ between the surface of the at least one layer of optical waveguide lens and the vertical direction and the included angle $\theta$ between the in-coupling direction of image light emitted from the light engine and the surface normal line of the at least one layer of optical waveguide lens satisfy the following formula:

$$\theta + \gamma \leq 20°.$$

6. The display device according to claim 1, wherein the linewidth $\delta\lambda$ of the visible laser light, an in-coupling grating period, and a turning and out-coupling grating period satisfy the following formula:

$$\delta\lambda = \frac{\Lambda_1\Lambda_2 \sin\varepsilon \cos\theta}{\Lambda_1 - \Lambda_2},$$

wherein $\varepsilon$ is an angular resolution of a human eye, $\theta$ is the included angle between the in-coupling direction of image light emitted from the light engine and the surface normal line of the at least one layer of optical waveguide lens, $\Lambda_1$ is an in-coupling grating period, $\Lambda_2$ is a turning and out-coupling grating period, and $\delta\lambda$ is the linewidth of the visible laser light.

7. The display device according to claim 1, wherein the optical waveguide substrate has a thickness of 0.3 mm to 2.5 mm and a refractive index of 1.4 to 2.2.

8. The display device according to claim 7, wherein the optical waveguide substrate is transparent, has a fixed thickness, has two opposite optical planes, and is made of a material comprising glass or quartz.

* * * * *